United States Patent [19]
Spahlinger

[11] Patent Number: 5,351,123
[45] Date of Patent: Sep. 27, 1994

[54] METHOD AND APPARATUS FOR STABILIZING CONTROL LOOP SCALE FACTOR AND GAIN IN A FIBER OPTIC SAGNAC INTERFEROMETER

[75] Inventor: Günter Spahlinger, Stuttgart, Fed. Rep. of Germany

[73] Assignee: LITEF GmbH, Freiburg im Breisgau, Fed. Rep. of Germany

[21] Appl. No.: 973,761

[22] Filed: Nov. 9, 1992

[30] Foreign Application Priority Data

Jan. 13, 1992 [EP] European Pat. Off. ......... 92100460.2

[51] Int. Cl.$^5$ ............................................. G01C 19/72
[52] U.S. Cl. ............................................................. 356/350
[58] Field of Search ............................................... 356/350

[56] References Cited

FOREIGN PATENT DOCUMENTS 0436052 7/1991 European Pat. Off. ............ 356/350
0441998 8/1991 European Pat. Off. ............ 356/350

*Primary Examiner*—Samuel A. Turner
*Attorney, Agent, or Firm*—Elliott N. Kramsky

[57] ABSTRACT

A method and apparatus for stabilizing the scale factor and the loop gain of the control loop of a fiberoptic Saganc interferometer with phase resetting. A digital evaluation circuit includes two auxiliary control loops, one for nominal gain of the scale factor control and the other for stabilization of loop gain of the primary control loop, in addition to the control loop for the readjustment of the phase modulator. The evaluation circuit can be realized as an integrated circuit. In addition to the optimization of control bandwidth, the circuit avoids substantial complexity of the circuit subassemblies for generating modulation and demodulation signals and control signals for the scale factor control loop.

10 Claims, 3 Drawing Sheets

METHOD AND APPARATUS FOR STABILIZING CONTROL LOOP SCALE FACTOR AND GAIN IN A FIBER OPTIC SAGNAC INTERFEROMETER

BACKGROUND

1. Field of the Invention

The present invention relates to apparatus and methods for measuring rotational speed with a fiber optic Sagnac interferometer. More particularly, this invention pertains to apparatus and methods for stabilizing the scale factor and loop gain of the control loop of a fiber optic Sagnac interferometer with phase resetting.

2. Description of the Prior Art

European patent publication EP-A1-0,441,998 discloses a fiber optic Sagnac interferometer suitable for inertial rotational speed measurement and also known for short as a fiber-optic gyro. In that device, bias errors and deadbands caused by electromagnetic overcoupling based thereupon are removed through a modulation method controlled by a random number generator. The method guarantees the correlation freedom of a demodulator reference signal. Unfortunately, the solution described in the above-mention publication entails highly complex circuitry for the subassemblies that generate the modulation and demodulation signals and obtain a control signal for the scale factor control loop.

SUMMARY AND OBJECTS OF THE INVENTION

It is therefore an object of this invention to provide a method and apparatus for measurement of rotational speed with a fiber-optic gyro, in which modulation and demodulation signals can be generated, along with signals for stabilizing scale factor, in a substantially simpler way.

A further object of the invention is to accomplish the above object by means of wholly digital signal processing.

It is yet another object of the invention to accomplish the above objects by means of an integrated circuit.

It is still yet another object of the invention to achieve the above objects in the absence of production-induced variations in the effective loop gain.

The preceding and additional objects are addressed by the present invention that provides, in a first aspect, an improvement in a method for rotational speed measurement by means of a fiber-optic Sagnac interferometer with phase resetting. Such interferometer is of a type in which two polarized light beams originating from a single light source and generated by beam splitting are irradiated in opposite directions into a fiber coil and subsequently reunited. The interference pattern thereby produced is detected and an electrical signal corresponding to the light intensity of the interference pattern is detected. The two light beams are modulated by a control signal composed of a plurality of variable components. A first signal component is a resetting signal that is generated via a digital control process and compensates non-reciprocal, incremental phase shifts in the two light beams. The second signal component, controlled by a first random number generator, assumes in each case for time $T_o$ the values $0$ or $\pi$ where $T_o$ corresponds to the transit time of each of the two light beams through the fiber coil in the quiescent state.

The invention improves the method for rotational speed measurement by means of a fiber-optic Sagnac interferometer of the above-identified type by adding a third signal component to the control signal where the third signal component is controlled by a second random number generator and assumes the values $\pi/2+d$ or $\pi/2-d$ for the time $T_o$. Further, the combined control signal is subjected to an integration process with modulo-$2\pi$ resetting in which both the resetting signal and the second and third signal components are supplied before the joint integration process.

In another aspect, the invention provides an improvement in apparatus for measuring rotational speed with a phase-resetting fiber-optic Sagnac interferometer. Such interferometer is of the type in which two beams originating from a single light source, polarized by means of a polarizer and generated by a beamsplitter, are irradiated in opposite directions into a fiber coil and subsequently reunited at the beamsplitter. The interference pattern produced from beam recombination is scanned by a photodetector that supplies a signal corresponding to the light intensity of the interference pattern and is applied to a first amplifier having a downstream analog-to-digital converter whose output values are processed in a digital evaluation circuit that, on the one hand, provides a digital-to-analog converter having a downstream second amplifier with the digital phase resetting signal generated via a primary control loop to obtain the resetting signal which is applied to the phase modulator and a signal proportional to the rotational speed and, on the other hand, provides via a first auxiliary control loop a first actuating signal for the gain $a_1$ of the second amplifier in such a way that the nominal value relationship $a_1 c_1 = 1$ is fulfilled where $c_1$ is the electrooptic coupling factor.

The improvement in the above apparatus resides in the gain $a_o$ of the first amplifier being controllable and the evaluation circuit providing a second actuating signal for the gain $a_o$ via a second auxiliary control loop. The value of the second actuating signal is a measure of the deviation of the product $a_o c_o$ from 1 where $c_o$ is a constant that depends on the mean light power at the photodetector, its sensitivity and the total gain in the primary control loop.

The foregoing and additional advantages and features of this invention will become further apparent from the detailed description that follows. This description is accompanied by a set of drawing figures in which numerals, corresponding to those of the written description, point to features of the invention. Like numerals refer to like features throughout both the written text and the drawing figures.

DETAILED DESCRIPTION

The signal processing of measured values supplied by the Sagnac interferometer along with the evaluation of such values is described below.

1. Sagnac Interferometer

Figure 1:
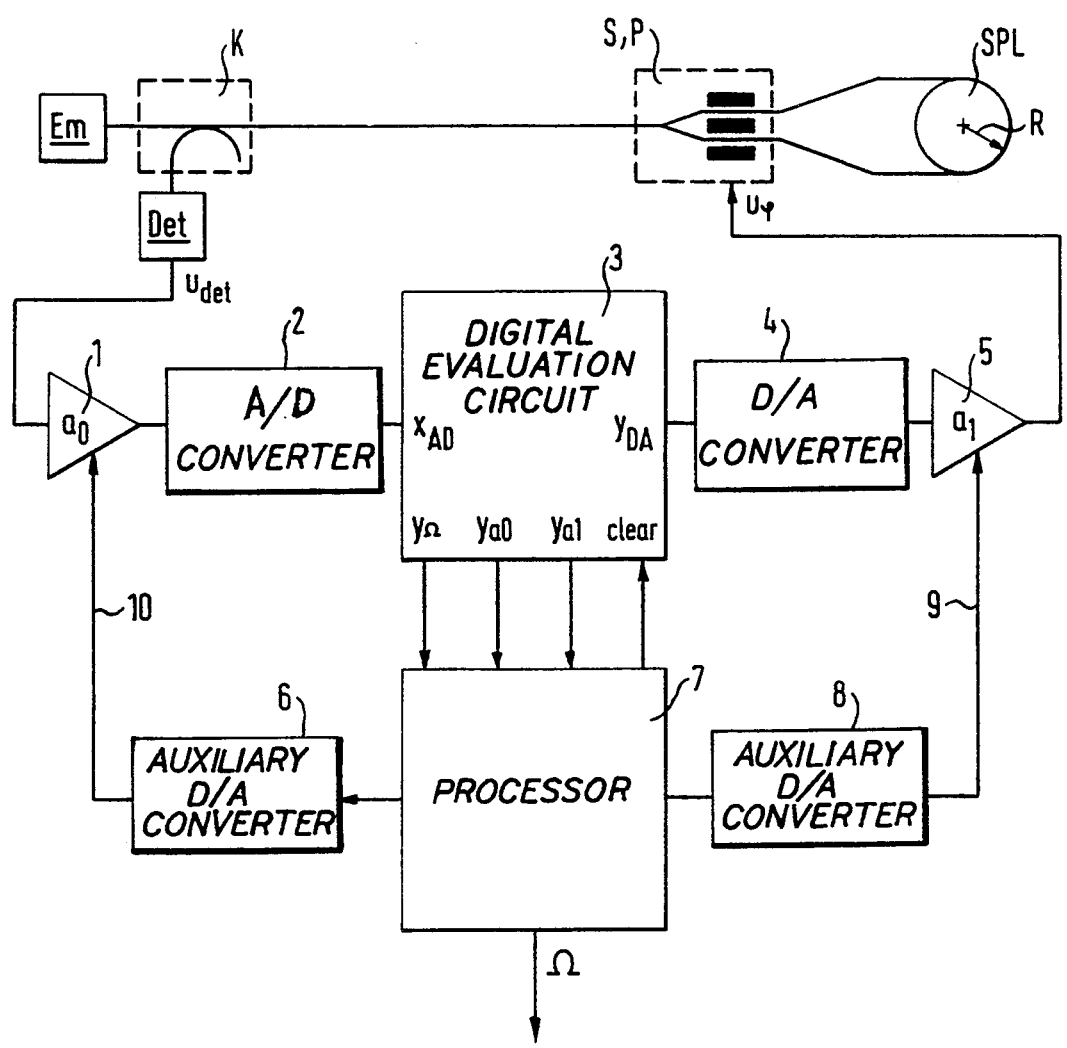
FIG. 1 is a block diagram of signal processing apparatus for rotational speed measurement by a fiber optic gyroscope in accordance with the invention.

FIG. 1 is a block diagram of signal processing apparatus for rotational speed measurement by a fiber optic gyroscope in accordance with the invention. The upper part of FIG. 1 corresponds to a conventional arrangement. A light source Em emits light of wavelength $\lambda$ and frequency $\omega = 2\pi c/\lambda$ where c is the speed of light. Light waves traverse a coupler K and are then subdivided into two beams in a beamsplitter S. The beam pair traverse a phase modulator P which impresses additional phase modulation that produces a phase shift of $-\phi(t) = -c_1 \cdot u_{100}(t)$ therebetween where $u_\phi$ is the control voltage of the phase modulator P, and $c_1$ is the electrooptic coupling factor. (The negative sign was chosen arbitrarily for the resultant phase difference.)

The two beams traverse a fiber of length $L_o$ in opposite directions which rotates with angular velocity $\Omega(t)$ with respect to inertial space and is wound upon a coil SPL of radius R. An additional phase shift of $\phi_s(t) = \Omega(t) S'$ occurs between the two beams as a result of the Sagnac effect where $S' - \phi(t - T_o)$ exists Assuming the transit time of the light through the fiber coil to be $T_o$, a phase shift $\Omega(t) S' - \phi(t - T_o)$ exists between the two beams after they have passed the coil SPL. The two beams next again traverse the phase modulator P with functions exchanged so that a phase $\phi(t)$ of positive sign is added. The two beams are thus brought into interference in the beamsplitter S with a total phase shift $\Omega(t) S = \phi(t) - \phi(t - T_o)$.

After recombination, the light wave returns to the coupler K, where a portion of the energy is split to a photodetector Det. An output voltage $u_{det} = c_o \cos(\Omega(t) S' + \phi(t) - \phi(t - T_o))$, dependent on the phase shift between the interfering light beams, is generated where constant $c_o$ is a function of the mean light power at the receiver (i.e. at photodetector Det), receiver sensitivity and the amplification of subsequent stages. The beamsplitter S and the phase modulator P are associated in FIG. 1 as a single component by a dashed border. That can be embodied as a PYP chip in integrated optics.

2. Signal Processing

The lower portion of the block diagram of FIG. 1 functions to bring the Sagnac interferometer to a state that permits evaluation of the detector signal $u_{det}$ to determine rotational speed $\Omega(t)$ by feeding suitable signals to the phase modulator P.

The signal $u_{det}$ generated by the photodetector Det is supplied to an amplifier stage 1 having an adjustable gain $a_o$. As a result, the signal is brought to a defined level $a_o u_{det}$ and subsequently digitized by an analog-to-digital converter. The signal $x_{DA}$ is obtained and supplied to a digital evaluation circuit 3 (described in detail below.) The digital evaluation circuit 3 generates an output signal $y_{DA}$ that is converted by a digital-to-analog converter 4 into an analog voltage and supplied (after multiplication by an adjustable gain $a_1$) to the phase modulator P. It is helpful for gain adjustment purposes to provide a multiplying digital-to-analog converter 4, 5 with use being made of a voltage, supplied by an auxiliary digital-to-analog converter 8 at the reference voltage input 9 for adjusting the gain. The digital evaluation circuit 3, the analog-to-digital converter 2 and the multiplying digital-to-analog converter 4, 5 operate at clock rate $T_o$. A closed signal path is thus formed whose function is described in detail below.

The digital evaluation circuit 3 supplies the output variables $y_\Omega$ for the rotational speed, $Y_{ao}$ for the gain $a_o$ of the input branch (which can be adjusted via a reference input 10 at the amplifier stage 1) and $y_{a1}$ for the gain $a_1$ of the multiplying digital-to-analog converter 4, 5 in the output branch at specific, selectable instants. All of such variables comprise averaged values that are made available to a processor 7 for further processing. An input "clear" of the evaluation circuit 3 is provided by the processor 7 or by a timer after each readout of the averaged output values. This serves to reset internal averaging units (explained in further detail below.) After-further filtering, the processor 7 computes the measured variable (i.e. the rotational speed $\Omega(t)$) from the previously averaged variables $y_\Omega$, $Y_{ao}$ and $Y_{a1}$ and the digital signals for adjusting the gains $a_o$ and $a_1$ that influence the assigned amplifier stages 1 and 5 via the auxiliary digital-to-analog converters 6 and 8 respectively.

3. Digital Evaluation Circuit

Figure 2:
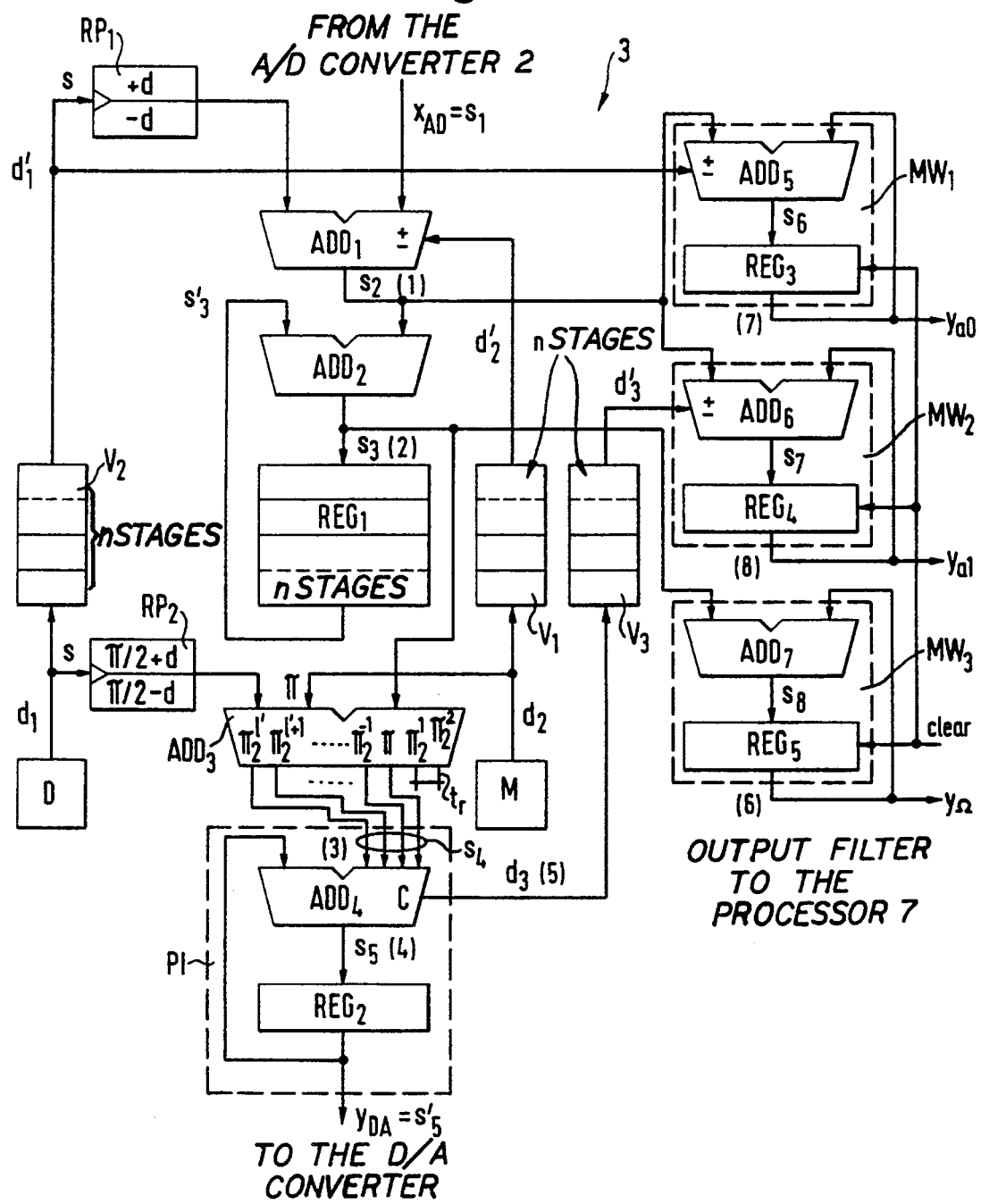
FIG. 2 is a detailed schematic diagram of a digital evaluation circuit utilized in signal processing apparatus in accordance with the invention.

FIG. 2 is a detailed schematic diagram of the digital evaluation circuit 3 of FIG. 1. By proper selection or adjustment of $a_1$ it is possible to achieve phase shifts $\phi$ at the modulator of the variable $v_k = \pi 2^k$ that correspond to the individual bits in the data word $y_{DA}$ since a relationship between the output-side digital data words $y_{DA}$ and optical phase $\phi$ exists via the gain $a_1$ and the electrooptic coupling factor $c_1$. In order to simplify further considerations, the values $v_k = \pi 2^k$ are assigned directly to the place values of bits of the digital data word. This convention applies to all digital data words of the valuation circuit as well as to $y_{DA}$. That is, it is applicable to the data words $s_i$, $i = 1, \ldots, 8$, $s'_3$, $s'_5$, $y_{ao}$, $y_{a1}$ and $y_\Omega$, explained below. Thus, in departure from the convention, the numerical value of a data word s with the bits $a_k$, $k = 1, \ldots, m$ is computed in accordance with $$s = \sum_{k=1}^{m} a_k v_k, \quad v = \pi 2^k$$

where $a_l$ is the LSB and $a_m$ the MSB of the data word. It then follows for the data word $y_{DA}$ with the bits $a'_k$, $k = l'. \ldots m'$ that $$Y_{DA} = \sum_{k=l'}^{m'} a'_k \pi 2^k$$

Since it holds for the phase shift that $$\phi = a_1 c_1 y_{DA}$$

the phase $\phi = y_{DA}$ for $a_1 c_1 = 1$. It therefore holds in this case that $$\phi = \sum_{k=l'}^{m'} a'_k \pi 2^k$$

As will be shown, $m' = 0$.

The input signal $x_{AD}$ supplied by the analog-to-digital converter 2 is transmitted as an internal signal $s_1$ to an input of a first adder $ADD_1$. In this case, a weighting with $1 - 2d'_2$ (i.e., with $+1$ or $-1$) is carried out which is dependent upon a demodulation signal $d'_2(i)$ that can assume the value 0 or 1. The demodulation signal $d'_2(i)$ is the modulation signal $d_2(i)$ delayed by n clock pulses by a first delay block $V_1$ having n time-delay stages and supplied by a first random number generator M. Thus $d'_2(i) = d_2(i-n)$ The variable n is preadjustable within prescribed limits and, as shown, serves to adapt the transit time to the external signal path, which, in addition to the interferometer, additionally comprises the subassemblies 1, 2, 4 and 5 of FIG. 1.

As mentioned the signals $d_2(i)$ and $d'_2(i)$ respectively may assume two states (i=0 or 1). For $d'_2=0$ addition of the variable (of the signal) $s_1$ is performed in the first adder $ADD_1$, while for $d'_2=1$ a subtraction occurs. The other input of the first adder $ADD_1$ is connected to a first register pair $RP_1$, in which two prescribed values, also referred to as test variables, $+d$ and $-d$, are stored.

As later shown, the test variable d is supplied as an additional signal to the primary control loop (see Section 4.2.1) for "measuring" the loop gain and regulating it with the aid of an auxiliary control loop (see Section 4.2.3) that influences the controllable amplifier stage 1, to a defined nominal value. The test signal $\pm d$ superimposed on the useful signal is selected sufficiently small to avoid overdrive of the external gyro path. As shown, with a correctly adjusted gain, exact compensation of the test signal takes place so the measurement accuracy of the interferometer is unaffected.

A select input s to which a control signal $d'_1$ is applied is provided for selecting the desired value. The selected value effective at the other input of the first adder $ADD_1$ is $(2d'_1-1)\times d$. This produces the following variable at the output of the first adder $ADD_1$:

$$s_2(i) = (2d'_1(i) - 1) \times d - (2d'_2(i) - 1) \times s_1(i) \qquad (1)$$

The numerals (1) .... (8) identifying the variables represented by equations are illustrated in FIG. 2 to facilitate comprehension of the function of the evaluation circuit of FIG. 2.

In a manner analogous to the deviation of $d'_2$, the signal $d'_1$ is produced from a signal $d_1$ by an n-stage delay with the aid of a second delay block $V_2$. The signal $d_1$ is generated by a second random number generator D, independent of the first random number generator M. The sum $s_2$ generated by $ADD_1$ is supplied to the inputs of two first and second averaging units $MW_1$ and $MW_2$ or of digital filters having a fifth adder $ADD_5$ or of a sixth adder $ADD_6$, described further below, as well as to a first input of a second adder $ADD_2$. The sum output $s_3$ of the latter is transmitted to a first register chain $REG_1$ and resupplied as a signal $s'_3(i)=s_3(i-n)$ delayed by n clock pulses to the other input of the second adder $ADD_2$:

$$s_3(i) = s_3(i-n) + s_2(i) \qquad (2)$$

In addition, the signal $s_3$ supplies a third averaging unit $MW_3$ or a third digital filter having a seventh adder $ADD_7$, explained further below as well as a first input of a third adder $ADD_3$. The signal $d_2$, described above and supplied by the first random number generator M, is supplied with significance $\pi$ to another input of $ADD_3$. The selectable output of a second register pair $RP_2$ having the stored values $\pi/2+d$ and $\pi/2-d$ is connected to the places of lesser significance ($\pi/2, \pi/4, ...$) of the same input. The selection is performed with the signal $d_1$ described above which is generated by the second random number generator D. As a result, the signal:

$$s_4(i) = s_3(i) + \pi/2 + d_2\pi + (2d_1-1) \times d \qquad (3)$$

is produced as the sum output of $ADD_3$. As shown in FIG. 2, all the bits of significance $2\pi$ and higher are separated at the point "tr" from the sum signal $s_4$ of the third adder $ADD_3$. This process corresponds to a modulo-$2\pi$ operation.

The remaining bits are supplied to a first input of a phase integrator PI that consists of a fourth adder $ADD_4$ and a second register $REG_2$. The sum output $s_5$ of $ADD_4$ similarly contains only the bits of significance lower than $2\pi$ and is delayed at $REG_2$ by one clock pulse and resupplied to the other input of the fourth adder $ADD_4$. The carry bit C produced during addition is transmitted as input signal $d_3$ to a third n-stage delay block $V_3$. At the output of $ADD_4$ this produces the sum signal $$s_5(i = mod2\pi[s_5(i-1) + mod2\pi[s_4(i)]] \qquad (4)$$

and, as the carry signal, $$d_3(i) = \frac{s_5(i-1) + mod2\pi[s_4(i)] - s_5(i)}{2\pi} \qquad (5)$$

The output of the register $REG_2$ is simultaneously supplied as output signal $y_{DA}$ to the digital-to-analog converter 4.

As mentioned, the signals $s_2$ and $s_3$ are connected to the inputs of three digital filters or averaging units $MW_1$, $MW_2$ and $MW_3$ that comprise accumulators that can be reset from outside. Each accumulator is constructed in each case from an adder whose output is fed back to an adder input via an assigned register. In this way the signal to be averaged is summed over a predetermined period of m clock cycles.

The averaged rotational speed value $Y_\Omega$, $$Y_\Omega = \sum_{i=1}^{m} s_3(i) \qquad (6)$$

is produced by accumulation of $s_3$ with the aid of $ADD_7$ via a fifth register $REG_5$. The actuating variable $Y_{ao}$ for gain $a_o$ is produced in the first averaging unit $MW_1$ by an accumulation of $s_2$ carried out with the aid of $ADD_5$ via a third register $REG_3$. An additional weighting, dependent on $d'_1$, of $s_2$ with $+1$ or $-1$ is undertaken:

$$Y_{ao} = \sum_{i=1}^{m} s_2(i)(2d'_1(i) - 1) \qquad (7)$$

The adjusting variable $Y_{a1}$ for the gain $a_1$ is similarly produced by weighted accumulation, dependent on $d'_3$, of $s_2$ in the second averaging unit $MW_2$ with the aid of $ADD_6$ and a fourth register $REG_4$. The sign weighting $d'_3$ corresponds to the signal $d_3$ delayed by n clock pulses by the third delay block $V_3$ and is formed from the carry bit C of significance $2\pi$ of the fourth adder $ADD_4$ of the phase integrator PI:

$$Y_{a1} = \sum_{i=1}^{m} s_2(i)(2d'_3(i) - 1) \qquad (8)$$

4. Mode of Operation

4.1 Interferometer

As explained with reference to the Sagnac interferometer (see Section 1), the detector Det supplies the voltage $$u_{det} = c_0(\Omega \times S' + \theta(t-T_o)) \quad (9)$$

Considering further the electrooptic coupling factor $c_1$ and the adjustable gains $a_o$ and $a_1$, it holds for the digital signals at the input of the evaluation circuit 3 that:

$$X_{AD} = a_o c_o \cos[\Omega \times S' + a_1 c_1 (y_{DA}(i) - y_{DA}(i-1))] \quad (10)$$

4.2 Control Loops of the Evaluation Circuit

4.2.1 Primary Control Loop

Assuming that the gains $a_o$ and $a_1$ are adjusted so that $a_o c_o = 1$ and $a_1 c_1 = 1$ hold and that a further $n-1$ dead times are to be taken into account because of the characteristics of the transducers 2, 4, it then holds that:

$$X_{AD}(i+n) = \cos(\Omega \times S' + y_{AD}(i+1) - y_{AD}(i)) \quad (11)$$

Referring to the circuit of FIG. 2 $Y_{DA}(i) = s'_5(i)$ and $y_{DA}(i+1) = s_5 5(i)$. It holds, furthermore, that:

$$s_4(i) = s_5(i) - s'_5(i) + k2\pi \quad (12)$$

The $k \times 2\pi$-fold deviation arises from the modulo-$2\pi$ operation that occurs at "tr". The term $k2\pi$ can be omitted from the argument of the cosine function because of its periodicity. Consequently, it holds that:

$$x_{AD}(i+n) = \cos(\Omega S' + s_4(i)) \quad (13)$$

Assuming that $d=0$ holds in the two register pairs $RP_1$ and $RP_2$ for the test variable, it then holds that:

$$s_4(i) = s_3(i) + \pi/2 + d_2 \pi \quad (14)$$

It follows, since $\cos(x+\pi/2) = -\sin(x)$, $\sin(x) = -\sin(x+\pi)$ and $s_1 = x_{AD}$ that:

$$s_1(i+n) = \sin(\Omega \times S' + s_3(i)) \times (2d_2(i) - 1) \quad (15)$$

On the other hand, it holds that:

$$\begin{aligned} s_2(i+n) &= -s_1(i+n) \times (2d'_2(i+n)-1) \\ &= s_1(i+n) \times (2d_2(i)-1) \end{aligned} \quad (16)$$

It follows from the above that:

$$s_2(i+n) = -\sin(\Omega \times S' + s_3(i)) \quad (17)$$

The electronic evaluation system is a closed control loop that attempts to drive the system deviation $\Omega S' + s_3(i)$ as small as possible. When the variable, which occurs in the argument of the sine function of equation (17), is small, the sine can be replaced as an approximation by its argument, and it holds that:

$$s_2(i+n) = -\Omega S' - s_3(i) \quad (18)$$

or, when transformed in terms of z:

$$S_2(z) = -z^{-n}(\Omega S' + S_3(z)) \quad (19)$$

The following stage, combined from $ADD_2$ and $REG_1$, and having the following transfer function $$\frac{S_3(z)}{S_2(z)} = \frac{1}{1-z^{-n}} \quad (20)$$

closes the control loop. Eliminating the variable $S_2(z)$ from the last two equations (19) and (20) yields the relationship $$S_3(z) = -z^{-n} \Omega S' \quad (21)$$

The signal $s_3$ is thus proportional to the rotational speed $\Omega$. The third averaging unit $MW_3$ consisting of $ADD_7$ and $REG_5$ generates the signal $y_\Omega$ from this.

4.2.2 Auxiliary Control Loop For the Gain $a_1$

The preceding explanation assumes that the condition $a_1 c_1 = 1$ is fulfilled. A particular (first) auxiliary control loop readjusts $a_1$ until this requirement is fulfilled. In this case, account is to be taken of the fact that the modulo-$2\pi$ operation carried out digitally at "tr" generates an additional error signal when the phase in the interferometer does not jump by exactly $2\pi$. In accordance with equation (10), the effective phase at the detector Det is $$\phi_d(i+1) = \Omega S' + a_1 c_1 (s_5(i) - s_5(i-1)) \quad (22)$$

When the product $a_1 c_1$ deviates from the ideal value "1" a phase error of $$\phi_e(i+1) = (a_1 c_1 - 1)(s_5(i) - s_5(i-1)) \quad (23)$$

is added to the "ideal" detector phase. This phase error appears as an additional rotational speed signal after demodulation. The error signal is thus the scale factor deviation modulated by $s_5(i) - s_5(i-1)$. In accordance with equation (5), it holds that:

$$s_5(i) - s_5(i-1) = mod2\pi[s_4(i)] - 2\pi d_3(i) \quad (24)$$

The right-hand side of the above equation can be interpreted as a two's-complement number having the sign bit $d_3$. Thus, $d_3$ is the sign of the signal $[s_5(i) - s_5(i-1)]$ modulating the scale factor deviation $(a_1 c_1 - 1)$. The error modulated in this fashion appears after n clock pulses with the signal $s_2$ at the output of the first adder $ADD_1$ and is demodulated with the sign $d'_3(i)$, likewise delayed by n clock pulses, to derive the actuating variable for $a_1$. This is formed with the aid of the second averaging unit $MW_2$ built up from $ADD_6$ and $REG_4$. The additional demodulation is performed via the $\pm$-control input of the adder $ADD_6$. The averaged signal $Y_{a1}$ at the output of the second averaging unit $MW_2$ is therefore a measure of the deviation of the gain $a_1$ from the nominal value and is used to adjust the factor to the nominal value $a_1 c_1 = 1$.

4.2.3 Auxiliary Control Loop For Gain $a_o$

The inventor has recognized that it is necessary for stability of the primary control loop that the loop gain have the correct value as determined by $a_o c_o = 1$. To fulfill such condition a further (second) auxiliary control loop is provided to adjust $a_o$. In accordance with equation (18), the signal $-s_3$ delayed by n clock pulses is produced for the signal $s_2$ in the case of $\Omega=0$. Equation (18) becomes $$s_2(i+n) = -a_o c_o s_3(i) \qquad (25)$$

for $\Omega=0$ and $a_o c_o \neq 1$.

To find a measure of deviation of the factor $a_o$ from the ideal value automatically, the abovementioned small test variable $+d$ and $-d$ is fed into the second register pair $RP_2$ (in addition to the value $\pi/2$.) As a result, an additional test signal $(2d_1(i)-1)$ d, whose sign is controlled by the second random number generator D, is fed into the third adder $ADD_3$, and added to $s_3$.

If one is interested solely in the effect of the test signal d, equation (25) becomes $$s_2(i+n) = -a_o c_o \times (2d_1(i)-1) \times d \qquad (26)$$

If, now, the same test variables $+d$ and $-d$ are stored in the first register pair $RP_1$, the test signal $(2d_1(i+n)-1)$ d is added to $s_2(i+n)$, and it holds that $$s_2(i+n) = (1 - a_o c_o)(2d_1(i)-1) \times d \qquad (27)$$

A component of the test signal d, weighted with $(1-a_o c_o)$, thus appears at the output of the first adder $ADD_1$. This component is filtered with the aid of the first averaging unit $MW_1$, whose input signal $s_2$ is weighted with the sign of the test signal d. As a result, the averaged signal $y_{ao}$ measures the deviation of the product $a_o c_o$ from 1, and can be used to adjust the control variable $a_o$ to its nominal value of the amplifier stage 5.

5. Statistical Independence

To avoid deadbands of the rotational speed measuring apparatus due overcoupling of the output signal $Y_{DA}$ onto the input $x_{AD}$, the evaluation circuit of FIG. 2 provides that the signal $y_{DA}$ is not correlated with the demodulator reference $d'_2$. The only common information source for the two signals is the first random number generator M that generates the modulation signal $d_2$. It can be shown, first, that only the most significant bit MSB of $y_{DA}$ depends on $d_2$. Given proper selection of the parameters of the first random number generator M, it is however possible to be achieved despite such dependence as no correlation exists between the MSB of $y_{DA}$ and $d_2$. Consequently, $y_{DA}$ and the demodulator reference $d'_2$ are also uncorrelated, as will be shown with reference to FIG. 3.

Deadbands of the rotational speed measuring arrangement result from overcoupling of the signal $Y_{DA}$ onto the input $x_{AD}$ when the signal components present in $y_{DA}$ which originate from the first random number generator M are simultaneously correlated with the demodulator reference $d'_2$. To determine such correlation, it is first necessary to analyze the signal path from the first random number generator M to the output signal $y_{DA}$. Due to the modulo-$2\pi$ operation that takes place in the path, the adders $ADD_3$ and $ADD_4$ are expanded only up to a place value of $v_o = \pi$. An analysis on the full adder level indicates the structure illustrated in FIG. 3 for the adders $ADD_3$, $ADD_4$ and the second register $REG_2$.

The signal $d_2$ supplied by the first random number generator M acts only on the most significant bit MSB of the digital-to-analog converter 4, $y_{DA,o}$. The sum output of a full adder supplies, regarded as a logic function, the EXOR operation of the two input summands and a possible input carry. Accounting for the commutativity of the EXOR operation, it can be observed from the block diagram of FIG. 3 that $y_{DA,o}(i)$ arises instantaneously as a chain of EXOR operations from $y_{DA,o}(i-1)$, $d_2(i)$, and a remainder $v(i)$ that depends exclusively on the resetting signal $s_3(i)$ and the test signal $\pi/2+d$ fed in If the logic levels of the signals $d_2$ and $y_{DA,o}(i)$ are defined for this purpose, the EXOR operation becomes a multiplication, and it holds that:

$$r(i) = r(i-1) \times t(i) \times v(i)$$

Where the residual signal $v(i)$ is assumed as already given in the analog representation with the values $\pm 1$.

The values $t(i) \in \{-1,1\}$ supplied by the random number generator M are taken to be uniformly distributed and uncorrelated:

$$\overline{t(i)} = \lim_{N \to \infty} \frac{1}{1+2N} \sum_{i=-N}^{N} t(i) = 0$$

$$C_{tt}(j) = \overline{t(i)t(i+j)} = \lim_{N \to \infty} \frac{1}{1+2N} \sum_{i=-N}^{N} t(i)t(i+j) = 0;$$

$$j \neq 0$$

Since $t(i)$ is statistically independent of $r(i-j)$, $j>0$, and $t(i)$ is assumed to be average-free, the sequence $r(i-j) \times t(i)$ is also average-free. Since the latter, in turn, is independent of the residual signal $v(i)$, it also holds that $$\overline{r(i-j) \times t(i) \times v(i)} = 0$$

It therefore holds, with $j=1$, that:

$$\overline{r(i)} = \lim_{N \to \infty} \frac{1}{1+2N} \sum_{i=-N}^{N} r(i-1)t(i)v(i) = 0$$

Since $t(i)$ is also independent of $r(i-1)$ $r(i-j)$, $j>0$, it holds with the same reasoning as above and because of $r(i)r(i-j) = r(i-1)r(i-j)v(i)t(i)$ that:

$$C_{rr}(j) = C_{rr}(-j) =$$

$$\lim_{N \to \infty} \frac{1}{1+2N} \sum_{i=-N}^{N} r(i-1)r(i-j)v(i)t(i) = 0; \quad j \neq 0$$

It has thus been demonstrated that the sequence $r(i)$ is also average-free and consists of statistically mutually independent components.

The correlation is now desired between the signal component $r(i)$ occurring in the output signals $y_{DA}(i)$ and the demodulator reference $d'_2(i)$ which is $t(i-n)$ in an analogous representation. It holds that $$C_{rt}(j) = \lim_{N \to \infty} \frac{1}{1+2N} \sum_{i=-N}^{N} r(i+j) \times t(i)$$

$$= \lim_{N \to \infty} \frac{1}{1+2N} \sum_{i=-N}^{N} r(i)r(i-1)r(i+j)v(i)$$

It follows immediately that $C_{rt}(j)=0$ for $j \neq 0, -1$, since for each given i the sequences $r(i), r(i-1), r(i+j)$ and $v(i)$ are mutually independent and $r(i)$ is average-free. It holds for $j=-1$ that $$C_{rt}(-1) = \lim_{N \to \infty} \frac{1}{1+2N} \sum_{i=-N}^{N} r(i)v(i) = 0$$

since $r(i)$ is average-free and independent of $v(i)$. By the same reasoning, it also holds for $j=0$ that $$C_{rt}(0) = \lim_{N \to \infty} \frac{1}{1+2N} \sum_{i=-N}^{N} r(i-1)v(i) = 0$$

Figure 3:
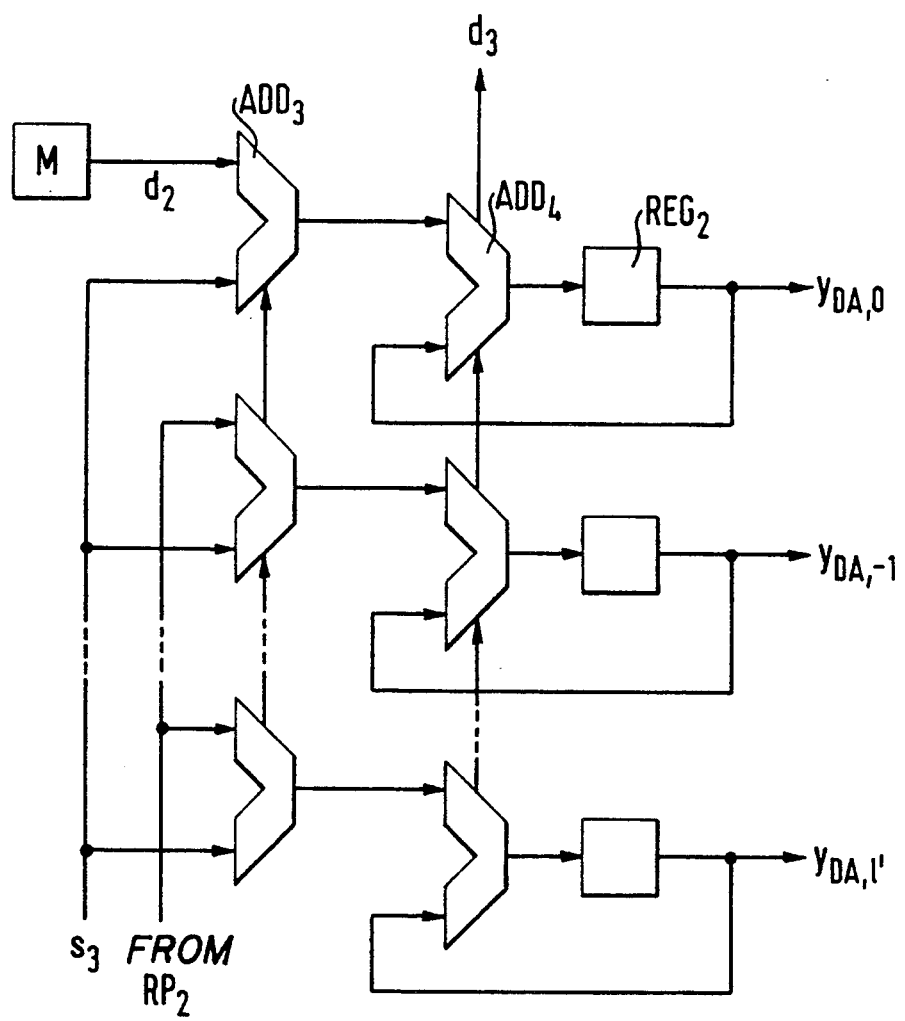
FIG. 3 is a diagram for facilitating analysis of a portion of the digital evaluation circuit.

The demodulator reference $t(i) = 1 - 2 d_2(i)$ is thus statistically independent of the digital-to-analog converter MSB $r(i) = 1 - 2 \times y_{DA,0}(i)$ and from $Y_{DA}$, as well, since the remaining bits of the digital-to-analog converter are independent from $t(i)$ in any case, as shown by the block diagram of FIG. 3.

In multiaxis systems, the interferometer, the amplifiers 1, 5, the converters 2, 4 and the evaluation circuit 3 are found more than once. With a compact structure, the problem of crosstalk at the analog input amplifiers frequently occurs so that the evaluation circuit 2 for one axis may react to rotational speeds in another axis. This problem has been removed by the invention through use of the statistically mutually independent demodulator references. In a three-axis system tested in practice, it was possible to show that the decoupling is still effective even when all three detector signals are added together to form a common signal for all three channels. As a result, the possibility of building multiaxis systems having a single analog input path consisting of the detector D, the input amplifier 1 and the analog-to-digital converter 2 occurs.

In contrast to the rotational speed measuring arrangement described in EP-A1-0,441,998, the invention provides multiple advantages, briefly summarized below:

An additional unit having a store and subtractor is not required to generate the reference signal for demodulating the scale factor error. The necessary information is extracted directly from the carry bit of the phase integrator PI in the circuit arrangement of the invention in accordance with FIG. 2.

As shown in the section entitled "Statistical independence", the adder ADD3 and the phase integrator PI are utilized in a double function for the decorrelation of demodulator signal and modulator signal (i.e. special gates and memories as in the prior art are not required.)

Production-induced deviations of the effective amplifiers and amplification fluctuations during operation in the receiver path consisting of the detector Det and the downstream amplifier stage 1 are compensated by additional stabilization of the loop gain of the primary control loop. In accordance with the invention, for this purpose use is made of the additional subassemblies contained in the digital evaluation circuit 3 that consists of the second delay chain $V_2$ and the changeover registers $RP_1$ and $RP_2$. Those subassemblies act like an internal reference path with nominal gain "1" and serve in the manner described to stabilize the gain of the external gyro path.

Concrete dimensioning is specified for the primary control loop which, taking account of a number n, arbitrary in principle, of "dead times", guarantees a frequency-independent readout characteristic in the control loop. The digital filter consisting of the second adder $ADD_2$ and the register chain $REG_1$ and having the transfer function $1/(1-z^{-n})$ are provided for this purpose.

Thus it is seen that the present invention provides a method and apparatus for measuring rotational speed with a fiber optic gyroscope in which modulation and demodulation signals, along with signals for stabilizing scale factor, can be generated in a substantially simpler manner than in the prior art. The invention may be implemented with wholly digital signal processing and incorporated into an integrated circuit thereby overcoming the possibility of production-induced variations in effective loop gain.

While this invention has been described with reference to its presently preferred embodiment it is not limited thereto. Rather, it is limited only insofar as defined by the following set of patent claims and includes all equivalents thereof within its scope.

What is claimed is:

1. In a method for rotational speed measurement by means of a fiber-optic Sagnac interferometer with phase resetting of the type in which two polarized light beams originating from a single light source and generated by beam splitting are irradiated in opposite directions into a fiber coil and subsequently reunited; the interference pattern produced in the process is detected, and an electrical signal corresponding to the light intensity of the interference pattern is generated; and in which the two light beams are modulated by a control signal composed of a plurality of variable components, of which a first signal component is a resetting signal which is generated via a digital control process and which compensates non-reciprocal, incremental phase shifts in the two light beams, and of which a second signal component, controlled by a first random number generator, assumes in each case for a time $T_o$ the values 0 or $\pi$, $T_o$ corresponding to the transit time of each of the two light beams through the fiber coil in the quiescent state, the improvement comprising the steps of:

a) adding a third signal component to the control signal ($u_\phi$), said third signal component being controlled by a second random number generator and assuming the values $\pi/2 + d$ or $\pi/2 - d$ for the time $T_o$ where d is a predetermined small test variable; and b) subjecting the combined control signal to an integration process with modulo-$2\pi$ resetting, in which both the resetting signal and the second and the third signal components are supplied before the joint integration process.

2. A method as defined in claim 1 wherein, after delay by a period corresponding to the signal transit time through the external interferometer signal path, the test variable d is added as a sign-matched compensation variable to the digitized and demodulated interference pattern signal.

3. A method as defined in claim 2 wherein the component of the test signal present in the compensated addition signal and weighted with a factor $(1-a_o c_o)$, is employed, after averaging in conjunction with simultaneous weighting with the sign of the test signal d, as control variable for the instantaneous nominal value adjustment of the modulation control signal where $a_o$ is the gain of the control signal and $c_o$ is a constant that depends upon the mean light power at the interference pattern detector, the sensitivity thereof and the gain of the interference pattern signal.

4. A method as defined in claim 2 wherein the addition signal weighted with the signal of the first random number generator delayed by the signal transit time through the external interferometer signal path is demodulated in a digital synchronous demodulator and output after digital filtering and averaging as a signal proportional to the rotational speed.

5. A method as defined in claim 4 wherein the addition signal weighted with the delayed signal of the first random number generator is subjected to digital averaging in conjunction with simultaneous sign weighting with a carry bit of significance $2\pi$ obtained from the modulo-$2\pi$ resetting from the common integration process, and the result of said averaging is used as adjusting variable for the gain of the detected interference pattern signal.

6. Apparatus for rotational speed measurement with a phase-resetting, fiber-optic Sagnac interferometer of the type in which two light beams originating from one light source polarized by means of a polarizer and generated by a beamsplitter are irradiated in opposite directions into a fiber coil and subsequently reunited at the beamsplitter; the interference pattern produced from beam recombination is scanned by a photodetector that supplies a signal corresponding to the light intensity of the interference pattern and is applied to a first amplifier having a downstream analog-to-digital converter whose output values are processed in a digital evaluation circuit that, on the one hand, provides a digital-to-analog converter having a downstream second amplifier with the digital phase-resetting signal generated via a primary control loop to obtain the resetting signal, which is applied to a phase modulator, and a signal proportional to the rotational speed and, on the other hand, provides via a first auxiliary control loop a first actuating signal for the gain $a_1$ of the second amplifier, in such a way that the nominal value relationship $a_1 c_1 = 1$ is fulfilled where $c_1$ is the electrooptic coupling factor, the improvement comprising:

a) the gain $a_o$ of the first amplifier being controllable; and b) the evaluation circuit provides a second actuating signal for the gain $a_o$ of the first amplifier via a second auxiliary control loop, the value of said second actuating signal being a measure of the deviation of the product $a_o c_o$ from 1 where $c_o$ is a constant that depends on the mean light power at the photodetector, the sensitivity thereof and the total gain in the primary control loop.

7. Apparatus as defined in claim 6 wherein the primary control loop additionally comprises:

a) a first adder to which the output signal of the analog-to-digital converter and a sign-weighted compensating test signal, supplied via a first changeover register and derived from a second random number generator via a second delay block, are applied, for compensating signal transit times;

b) said input signal being weighted at said first adder by a sign signal derived from said first random number generator and supplied via a first delay block for the purpose of compensating signal transit time;

c) a digital filter to which the output signal of the first adder is applied and whose output signal corresponds to the rotational speed signal, which is output via a third averaging unit; and d) an addition/integration stage to which on the input side the rotational speed signal is supplied as a first signal component from the demodulator, a signal, weighted with 0 or 90, is supplied as a second signal component from the first random number generator, and a second test signal, supplemented by $\pi/2$, is supplied via a second changeover register as a third signal component, said second test signal being derived from the second random number generator, a modulo-$2\pi$ resetting being performed in the integration stage.

8. Apparatus as defined in claim 7 wherein in addition to the first adder there belongs to the first auxiliary control loop a second averaging unit in whose adding stage a sign weighting of the output signal of the first adder is performed in the integration stage with the carry signal from the modulo-$2\pi$ resetting.

9. Apparatus as defined in claim 7 wherein in addition to the first adder there belongs to the second auxiliary control loop a first averaging unit in whose adding stage a sign-weighting of the output signal of the first adder is performed with the signal, delayed for the purpose of compensating the signal transit time, of the second random number generator.

10. Apparatus as defined in claim 6 wherein in the case of a multiaxis rotational speed measuring system in which an individual interferometer arrangement is assigned to each measurement axis the photodetector signals of all the interferometers, combined to form a single common signal for all the channels, are connected to a single analog channel comprising a single photodetector, an input amplifier and a common analog-to-digital converter.

* * * * *